: 
United States Patent
Watanabe et al.

(10) Patent No.: US 10,125,876 B2
(45) Date of Patent: Nov. 13, 2018

(54) DIAPHRAGM VALVE, FLUID CONTROL DEVICE, SEMICONDUCTOR MANUFACTURING APPARATUS, AND SEMICONDUCTOR MANUFACTURING METHOD

(71) Applicant: FUJIKIN INCORPORATED, Osaka-shi (JP)

(72) Inventors: Kazunari Watanabe, Osaka (JP); Izuru Shikata, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 22 days.

(21) Appl. No.: 15/322,566

(22) PCT Filed: Jun. 17, 2015

(86) PCT No.: PCT/JP2015/067432
§ 371 (c)(1),
(2) Date: Dec. 28, 2016

(87) PCT Pub. No.: WO2016/002514
PCT Pub. Date: Jan. 7, 2016

(65) Prior Publication Data
US 2017/0152954 A1    Jun. 1, 2017

(30) Foreign Application Priority Data
Jun. 30, 2014    (JP) .................. 2014-134976

(51) Int. Cl.
*F16K 7/16*    (2006.01)
*F16K 7/17*    (2006.01)

(52) U.S. Cl.
CPC . *F16K 7/16* (2013.01); *F16K 7/17* (2013.01)

(58) Field of Classification Search
CPC ............ F16K 7/16; F16K 7/14; C23C 16/455
USPC .............................................. 251/331, 335.2
See application file for complete search history.

(56) References Cited

U.S. PATENT DOCUMENTS

| | | | |
|---|---|---|---|
| 2003/0089402 A1* | 5/2003 | Gregoire ............ | G05D 16/0633 137/505.42 |
| 2007/0187634 A1* | 8/2007 | Sneh ........................ | F16K 7/14 251/30.01 |
| 2007/0295414 A1 | 12/2007 | Shinoharo et al. | |
| 2010/0090151 A1* | 4/2010 | Tanikawa ................... | F16J 3/02 251/331 |
| 2014/0001391 A1 | 1/2014 | Watanabe et al. | |

FOREIGN PATENT DOCUMENTS

| | | |
|---|---|---|
| JP | 2006-083959 A | 3/2006 |
| JP | 2012-026577 A | 2/2012 |
| JP | 2014-009765 A | 1/2014 |

OTHER PUBLICATIONS

International Search Report dated Sep. 15, 2015, issued for PCT/JP2015/067432.

* cited by examiner

*Primary Examiner* — Marina Tietjen
(74) *Attorney, Agent, or Firm* — Locke Lord LLP

(57) ABSTRACT

The radius of curvature (SR2) of a surface of a diaphragm presser, which surface is in contact with a diaphragm, is at least 30 mm. The taper angle (θ) for a lower surface of a press adapter is no more than 10° relative to a flat portion of a bottom surface of a depression of a body.

18 Claims, 6 Drawing Sheets

DIAPHRAGM VALVE, FLUID CONTROL DEVICE, SEMICONDUCTOR MANUFACTURING APPARATUS, AND SEMICONDUCTOR MANUFACTURING METHOD

CROSS REFERENCE TO RELATED APPLICATIONS

This application is related to co-pending application: "DIAPHRAGM VALVE, FLUID CONTROL DEVICE, SEMICONDUCTOR MANUFACTURING APPARATUS, AND SEMICONDUCTOR MANUFACTURING METHOD" filed even date herewith in the names of Kazunari WATANABE and Izuru SHIKATA as a national phase entry of PCT/JP2015/067433, which application is assigned to the assignee of the present application and is incorporated by reference herein.

TECHNICAL FIELD

The present invention relates to a diaphragm valve, a fluid control device, a semiconductor manufacturing apparatus, and a semiconductor manufacturing method. In particular, the present invention relates to a downsized diaphragm valve which is suitable to be used in a gas supply section of a semiconductor manufacturing apparatus, a fluid control device provided with such a diaphragm valve, a semiconductor manufacturing apparatus provided with this fluid control device, and a semiconductor manufacturing method using this semiconductor manufacturing apparatus.

BACKGROUND ART

FIG. 7 shows an example of a conventionally-known gas supply section (fluid control device) in a semiconductor manufacturing apparatus (such as a CVD apparatus and an etching apparatus) (Patent Literature 1).

In FIG. 7, a line (C) of the fluid control device consists of a plurality of upper stage members and a plurality of lower stage members. As the upper stage members, a check valve (21), a pressure regulator (22), a pressure sensor (23), an inverted-V-shaped-channel block (24), a shutoff-release device (25), a mass flow controller (26), an on-off valve (27), an inverted-V-shaped-channel block (28), and a filter (29) are arranged. As the lower stage members, in the order from the left, arranged are: an L-shaped-channel block joint (32) which is connected to the check valve (21) and to which an inlet joint (31) is attached; a V-shaped-channel block joint (33) which causes the check valve (21) and the pressure regulator (22) to communicate with each other; the V-shaped-channel block joint (33) which causes the pressure regulator (22) and the pressure sensor (23) to communicate with each other; the V-shaped-channel block joint (33) which causes the pressure sensor (23) and the inverted-V-shaped-channel block (24) to communicate with each other; the V-shaped-channel block joint (33) which causes the inverted-V-shaped-channel block (24) and the shutoff-release device (25) to communicate with each other; the V-shaped-channel block joint (33) which causes the shutoff-release device (25) and the mass flow controller (26) to communicate with each other; the V-shaped-channel block joint (33) which causes the mass flow controller (26) and the on-off valve (27) to communicate with each other; the V-shaped-channel block joint (33) which causes the on-off valve (27) and the inverted-V-shaped-channel block (28) to communicate with each other; the V-shaped-channel block joint (33) which causes the inverted-V-shaped-channel block (28) and the filter (29) to communicate with each other; and the L-shaped-channel block joint (32) which is connected to the filter (29) and to which an outlet joint (34) is attached.

The various joint members (31) (32) (33) (34) as the lower stage members are mounted on a long and narrow secondary base plate (40) and the various fluid controllers (21) (22) (23) (24) (25) (26) (27) (28) (29) as the upper stage members are attached so as to straddle to reach corresponding lower stage members (31) (32) (33) (34), whereby one line (C) is formed. A plurality of lines each having a configuration similar to that of the line (C) are arranged in parallel on a primary base plate (20), and the shutoff-release devices (25) of the lines (C) are connected by channel connection means (50) which consists of three I-shaped-channel block joints (51) and tubes (52) which connect the I-shaped-channel block joints (51), whereby the fluid control device is formed.

A semiconductor manufacturing process is carried out in a clean room in order to prevent pattern defect due to particle contamination. In proportion to increase of the volume of the clean room, initial cost for the construction and running cost increase. Increase of the running cost and so on lead to increase of manufacturing cost. Therefore, downsizing of the entire semiconductor manufacturing apparatus, which is permanently installed to be used in the clean room, has been a problem. Consequently, downsizing of the fluid control device, which is used in the semiconductor manufacturing apparatus, has also been a major challenge.

As a downsized diaphragm valve, Patent Literature 2 discloses a diaphragm valve comprising: a body provided with a fluid inflow channel, a fluid outflow channel, and a depression which is open upward; a seat disposed on a peripheral edge of the fluid inflow channel of the body; a spherical-shell-shaped diaphragm which is elastically deformable and which is pressed against and separated from the seat to close and open the fluid inflow channel, respectively; a press adapter which holds an outer peripheral edge portion of the diaphragm between the press adapter and a bottom surface of the depression of the body; a diaphragm presser which presses a center portion of the diaphragm; and vertical movement means which vertically moves the diaphragm presser; and the press adapter being tapered with an entire lower surface thereof having a predetermined angle of inclination, and the bottom surface of the depression of the body having a circular flat portion and a depressed portion which is contiguous to an outer periphery of the flat portion and which is depressed relative to the flat portion, wherein, in a state where the fluid channel is open, an upper surface of the outer peripheral edge portion of the diaphragm comes in surface contact with the tapered lower surface of the press adapter, and a lower surface of the outer peripheral edge portion comes in line contact with the outer periphery of the flat portion of the bottom surface of the depression of the body.

For the diaphragm valve, improvement of the durability of the diaphragm is important because the diaphragm greatly deforms every time open and close operations are performed.

When the diaphragm valve is downsized, the diaphragm is also downsized. With these downsizing, a space width between the seat and the diaphragm is narrowed, whereby the flow rate decreases. When the space width between the seat and the diaphragm is enlarged in order to prevent the decrease of the flow rate, the stroke of the diaphragm becomes greater, which causes a problem that the durability of the diaphragm is decreased, as a result.

Patent Literature 2 attempts to improve the durability by the feature that the taper angle of the lower surface of the press adapter is 15.5 to 16.5° relative to the flat portion of the bottom surface of the depression of the body and that the radius of curvature of a surface of the diaphragm presser which surface is in contact with the diaphragm is 10.5 to 12.5 mm.

CITATION LIST

Patent Literature

Patent Literature 1: Japanese Unexamined Patent Application Publication No. 2006-83959
Patent Literature 2: Japanese Unexamined Patent Application Publication No. 2014-9765

SUMMARY OF INVENTION

Technical Problem

As discussed above, downsizing of the semiconductor manufacturing apparatus of each type is a problem to be solved, and therefore downsizing of the diaphragm valve which is used in the gas supply section is also required.

In downsizing the diaphragm valve, improvement of the durability is a problem. When improvement of the durability is attempted, there arises a problem of improvement of the flow rate. According to Patent Literature 2, although the improvement of the durability of the small-sized diaphragm valve has been attempted, there has been a problem that the durability is inferior as compared with the diaphragm valve which is not downsized.

An object of the present invention is to provide a downsized diaphragm valve in which durability of the diaphragm valve is greatly improved.

Further, another object of the present invention is to provide a fluid control device provided with such a diaphragm valve, a semiconductor manufacturing apparatus provided with the fluid control device, and a semiconductor manufacturing method in which the semiconductor manufacturing apparatus is used.

Solution to Problem

The diaphragm valve in accordance with the present invention is a diaphragm valve comprising: a body provided with a fluid inflow channel, a fluid outflow channel, and a depression which is open upward; a seat disposed on a peripheral edge of the fluid inflow channel of the body; a spherical-shell-shaped diaphragm which is elastically deformable and which is pressed against and separated from the seat to close and open the fluid inflow channel, respectively; a press adapter which holds an outer peripheral edge portion of the diaphragm between the press adapter and a bottom surface of the depression of the body; a diaphragm presser which presses a center portion of the diaphragm; and vertical movement means which vertically moves the diaphragm presser; and the press adapter being tapered with an entire lower surface thereof having a predetermined angle of inclination, and the bottom surface of the depression of the body having a circular flat portion and a depressed portion which is contiguous to an outer periphery of the flat portion and which is depressed relative to the flat portion, wherein a radius of curvature of a surface of the diaphragm presser which surface is in contact with the diaphragm is at least 30 mm, and a taper angle for the lower surface of the press adapter is no more than 10° relative to the flat portion of the bottom surface of the depression of the body.

The diaphragm is, for example, configured such that the upper surface of the outer peripheral edge portion comes in surface contact with the tapered lower surface of the press adapter and that the lower surface of the outer peripheral edge portion comes in line contact with the outer periphery of the flat portion of the bottom surface of the depression of the body. With such a diaphragm, in a state where the fluid channel is open (normally, a state where the diaphragm protrudes upward to have the shape of a spherical shell), the upper surface of the outer peripheral edge portion of the diaphragm is in surface contact with the lower surface of the press adapter, whereby deformation from the state of the spherical shell shape, which is in the natural condition, is suppressed to be a slight deformation. In addition, the lower surface of the outer peripheral edge portion of the diaphragm is in line contact with the outer periphery of the flat portion of the bottom surface of the depression of the body, whereby, in a state where the diaphragm is held by the press adapter and the body, the state in which deformation from the state of the spherical shell shape, which is in the natural condition, is also suppressed to be a slight deformation, is maintained. In other words, the outer peripheral edge portion of the diaphragm which is elastically deformable and which has the shape of a spherical shell does not have a flat-shaped section which is undeformable and which bends relative to a spherical-shell-shaped section, whereby partial concentration of stress is avoided, deformation of the diaphragm is optimized, and durability of the diaphragm is improved.

Here, according to conventional design techniques, the radius of curvature of the surface of the diaphragm presser, which surface is in contact with the diaphragm, is set to be no more than 12 mm, and the taper angle for the lower surface of the press adapter is set to be about 16°, and they are to be selected from within these ranges after being modified as appropriate so as to have excellent durability.

In contrast, with the diaphragm valve in accordance with the present invention, the dimension is totally different from that according to the above-described conventional design techniques. The radius of curvature of the surface of the diaphragm presser, which surface is in contact with the diaphragm, is at least 30 mm, and the taper angle for the lower surface of the press adapter is no more than 10°, whereby improvement of the durability of the diaphragm is attempted.

The lower limit of the taper angle for the lower surface of the press adapter and the upper limit of the radius of curvature of the surface of the diaphragm presser, which surface is in contact with the diaphragm, are set such that performance capabilities (for example, flow rate) other than the durability may be secured.

Specifically, it is preferred that the flat portion of the bottom surface of the depression of the body is provided with a groove so as to include a portion of the fluid outflow channel, which portion is open to the bottom surface of the depression, the radius of curvature of the surface of the diaphragm presser, which surface is in contact with the diaphragm, is no more than 50 mm, and the taper angle for the lower surface of the press adapter is at least 5° relative to the flat portion of the bottom surface of the depression of the body.

The groove is provided such that an outer periphery of the flat portion, for supporting the outer peripheral edge portion of the diaphragm, remains to exist. An inner periphery of the groove may be configured not to be contiguous to the seat (the groove is an annular groove), and may be configured to be contiguous to a portion that holds the seat (the groove is a so-called "spot facing"). In a case of the annular groove, the height of the portion that holds the seat is the same as that of the outer periphery of the flat portion, for supporting the outer peripheral edge portion of the diaphragm. In a case of the spot facing, the height of the portion that holds the seat is lowered by the amount of the spot facing.

With this configuration, a diaphragm valve may be obtained which is small-sized and is excellent in durability, and which is also excellent in terms of securing the flow rate.

In addition, the diaphragm valve according to the present invention is a diaphragm valve comprising: a body provided with a fluid inflow channel, a fluid outflow channel, and a depression which is open upward; a seat disposed on a peripheral edge of the fluid inflow channel of the body; a spherical-shell-shaped diaphragm which is elastically deformable and which is pressed against and separated from the seat to close and open the fluid inflow channel, respectively; a press adapter which holds an outer peripheral edge portion of the diaphragm between the press adapter and a bottom surface of the depression of the body; a diaphragm presser which presses a center portion of the diaphragm; and vertical movement means which vertically moves the diaphragm presser; and the press adapter being tapered with an entire lower surface thereof having a predetermined angle of inclination, and the bottom surface of the depression of the body having a circular flat portion and a depressed portion which is contiguous to an outer periphery of the flat portion and which is depressed relative to the flat portion, wherein, when the valve is open, a ratio of a diameter of the diaphragm, to a distance from the bottom surface of the depression of the body, which bottom surface is in close contact with the diaphragm under pressure, to a vertex of the diaphragm is 18:1 to 30:1.

Here, in the case where the diaphragm consists of a plurality of sheets of diaphragms, the vertex of the upper surface of the diaphragm at the lowermost layer (liquid-contact side) is referred to as a vertex of the diaphragm.

In the case where the ratio of a diameter of the diaphragm, to a distance (height of the vertex of the diaphragm) from the bottom surface of the depression of the body, which bottom surface is in close contact with the diaphragm under pressure, to a vertex of the diaphragm is less than 18:1, the durability greatly decreases. When the ratio exceeds 30:1, the flow rate is significantly insufficient. By making the ratio 18:1 to 30:1, a diaphragm valve may be obtained which is small-sized and is excellent in durability, and which is also excellent in terms of securing the flow rate.

The diaphragm valve may be a manually operated valve in which the vertical movement means is an open/close handle and the like, or may be an automatically operated valve in which the vertical movement means is an appropriate actuator. In the case of the automatically operated valve, the actuator may be operated by means of fluid pressure (air pressure), or may be operated by means of an electromagnetic force.

In the present description, the movement direction of a stem of the diaphragm valve is referred to as a vertical direction. This direction is however used for convenience, and in the actual attachment, not only the vertical direction is made the up-down direction, but also the vertical direction is made the horizontal direction.

The fluid control device in accordance with the present invention is a fluid control device including an on-off valve as the fluid controller, wherein the on-off valve is the above-described diaphragm valve.

The diaphragm valve is excellent in terms of securing the flow rate as well as being excellent in durability. By using the diaphragm valve as the on-off valve of the fluid control device, a downsized fluid control device may be obtained.

Such a fluid control device contributes to downsizing of a semiconductor manufacturing apparatus by being used in the semiconductor manufacturing apparatus.

In addition, the semiconductor manufacturing apparatus in accordance with the present invention includes the above-described fluid control device as a gas supply section.

The above-described fluid control device is downsized because the above-described diaphragm valve is used. Therefore, the semiconductor manufacturing apparatus including such a fluid control device as a gas supply section is downsized.

The semiconductor manufacturing apparatus may be either one of a CVD apparatus, a spattering apparatus, or an etching apparatus.

Furthermore, in the semiconductor manufacturing method in accordance with the present invention, semiconductors are manufactured using the above-described semiconductor manufacturing apparatus.

By using the downsized semiconductor manufacturing apparatus, the footprint in the clean room is reduced, running costs for the clean room (manufacturing costs) are reduced, and therefore the semiconductors may be obtained using a more inexpensive manufacturing method.

Advantageous Effects of Invention

In the diaphragm valve in accordance with the present invention, the durability of the diaphragm is greatly increased because the present invention has a feature that the radius of curvature of the surface of the diaphragm presser, which surface is in contact with the diaphragm, is at least 30 mm, and that a taper angle for the lower surface of the press adapter is no more than 10°. These values adopted in the present invention have not been conventionally taken into consideration.

BRIEF DESCRIPTION OF DRAWINGS

FIG. 1 shows a diaphragm valve according to a first embodiment of the present invention.

FIG. 3 shows a diaphragm valve according to a second embodiment of the present invention.

FIG. 4 shows a diaphragm valve according to a third embodiment of the present invention.

REFERENCE SIGNS LIST (1): diaphragm valve, (2): body, (2a): fluid inflow channel, (2b): fluid outflow channel, (2c): depression, (4): seat, (5): diaphragm, (6): diaphragm presser, (7): stem, (8): press adapter, (14): bottom surface, (14a): flat portion, (14b): depressed portion, (14c): outer periphery, (15): spot facing (groove), (16): annular groove, (17): elongated hole

DESCRIPTION OF EMBODIMENTS

Embodiments of the present invention will now be described with reference to the drawings. In the following description, the "upper" and "lower" sides in FIG. 5 will be referred to as "upper" and "lower", respectively. The "right" and "left" sides in FIG. 5 will be referred to as "right" and "left", respectively.

Figure 5:
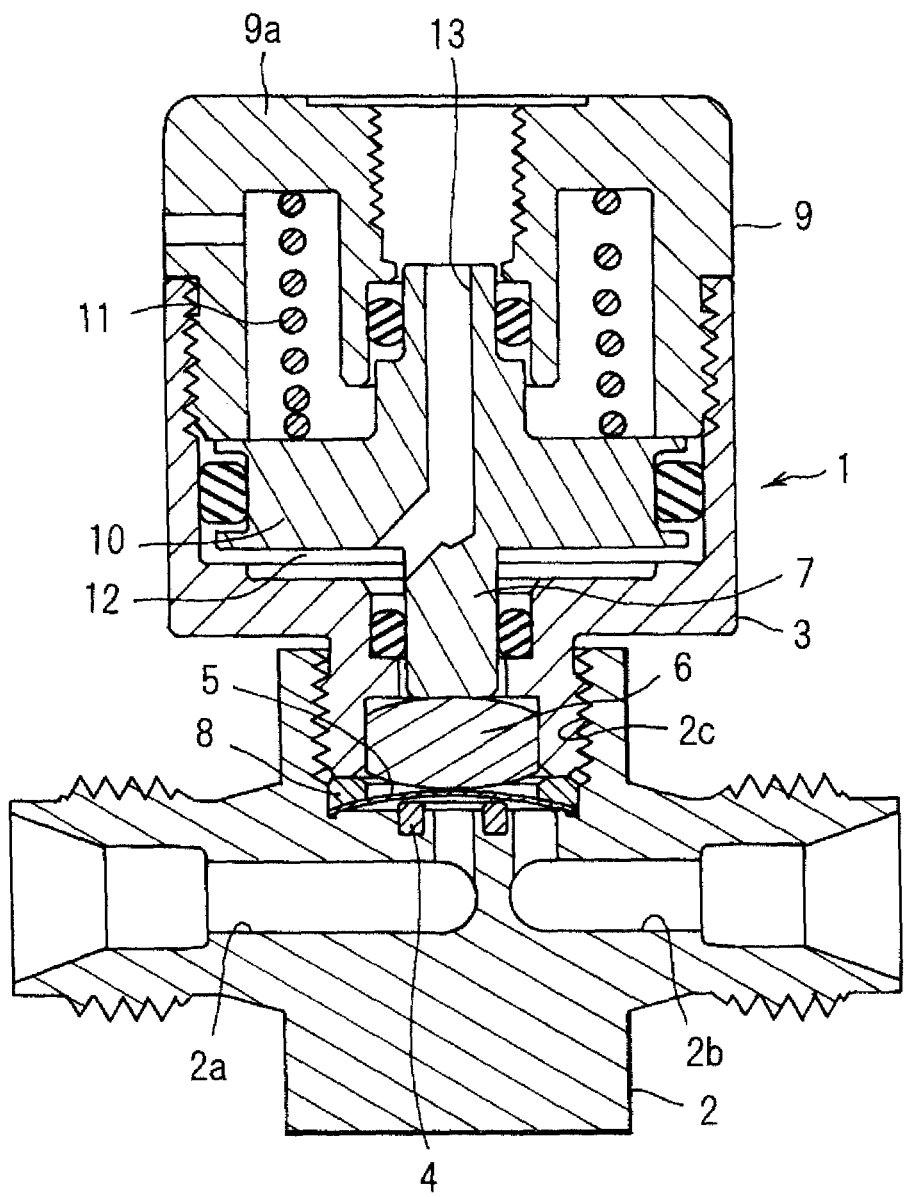
FIG. 5 is a vertical cross-sectional view showing the entire configuration of the diaphragm valve according to each embodiment of the present invention.

FIG. 5 shows a basic configuration of the diaphragm valve (1) in accordance with the present invention. The diaphragm valve (1) is provided with: a block-shaped body (2) having a fluid inflow channel (2a), a fluid outflow channel (2b), and a depression (2c) which is open upward; a cylindrical bonnet (3) which has a lower end portion screwed into an upper portion of the depression (2c) of the body (2) to extend upward; an annular seat (4) provided on a peripheral edge of the fluid inflow channel (2a); a diaphragm (5) which is pressed against or separated from the seat (4) to close or open the fluid inflow channel (2a), respectively; a diaphragm presser (6) which presses a center portion of the diaphragm (5); a stem (7) which is inserted into the bonnet (3) in a freely movable manner in the vertical direction to press the diaphragm (5) against the seat (4) or separate the diaphragm (5) from the seat (4) via the diaphragm presser (6); a press adapter (8) which is disposed between a lower end surface of the bonnet (3) and a bottom surface of the depression (2c) of the body (2) and which holds an outer peripheral edge portion of the diaphragm (5) between the press adapter (8) and the bottom surface of the depression (2c) of the body (2); a casing (9) which has a top wall (9a) and which is screwed into the bonnet (3); a piston (10) which is integrated with the stem (7); a compression coil spring (biasing member) (11) which biases the piston (10) downward; an operational air introduction chamber (12) provided on a lower surface of the piston (10); and an operational air introduction channel (13) through which operational air is introduced into the operational air introduction chamber (12).

Figure 1A:
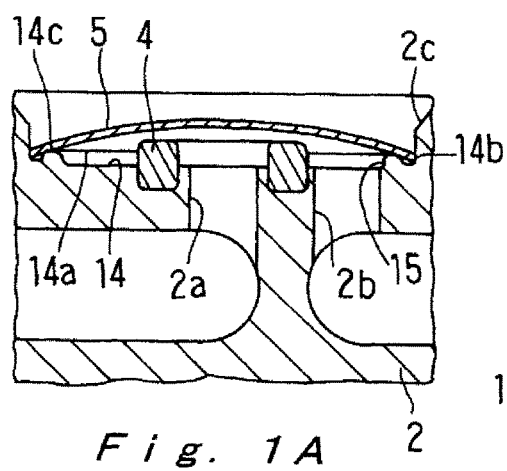
FIG. 1A is a vertical cross-sectional view of the principal components.
Figure 1B:
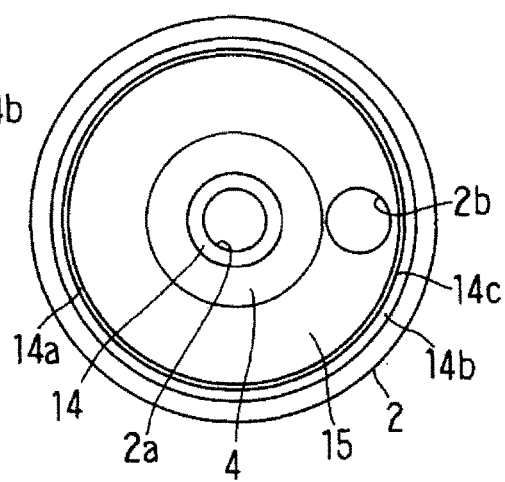
FIG. 1B is a plan view of FIG. 1A from which a diaphragm is removed.

In a channel open state shown in FIG. 1, a fluid which has flowed in from the fluid inflow channel (2a) flows into a space surrounded by the bottom surface of the depression (2c) of the body (2) and the diaphragm (5) to flow out through the fluid outflow channel (2b) to the outside.

The diaphragm (5) has the shape of a spherical shell, having an arc shape curving upward in a natural state. The diaphragm (5), for example, is made of a nickel alloy thin sheet, which is cut out into the shape of a circle, and is formed into a spherical shell having the center portion bulging upward. In some cases, the diaphragm (5) is made of a stainless steel thin sheet, and is made of a layered product formed of a stainless steel thin sheet and a nickel-cobalt alloy thin sheet.

FIG. 6 shows a main portion of a small-sized diaphragm valve, which the diaphragm valve in accordance with the present invention regards as a conventional art. In FIG. 6, the press adapter (8) is tapered with an entire lower surface (8a) thereof having a predetermined angle of inclination. The bottom surface (14) of the depression (2c) of the body (2) has a circular flat portion (14a) and a depressed portion (14b) which is contiguous to an outer periphery of the flat portion (14a) and which is depressed relative to the flat portion (14a).

The press adapter (8) is fixed in a state of coming in contact with the upper surface of the outer peripheral edge portion of the diaphragm (5), by the bonnet (3) being screwed into the body (2). At this time, the diaphragm (5) is held between the press adapter (8) and the bottom surface (14) of the depression (2c) of the body (2), in a state where the upper surface of the outer peripheral edge portion of the diaphragm (5) is in surface contact (contact over a wide range) with the tapered lower surface (8a) of the press adapter (8) in which the diaphragm (5) hardly deforms from its spherical shell shape (circular arc shape curving upward), since the entire lower surface (8a) of the press adapter (8) is tapered. In addition, since the outer peripheral edge portion of the bottom surface (14) of the depression (2c) of the body (2) is provided with a depressed portion (14b), the outer peripheral edge portion of the diaphragm (5) is accommodated in the depressed portion (14b). Consequently, the outer peripheral edge portion of the diaphragm (5) is not subject to a deformation along the bottom surface (14) of the depression (2c) of the body (2), and the lower surface of the outer peripheral edge portion of the diaphragm (5) comes in line contact with the outer periphery (diaphragm support portion) (14c) of the flat portion (14a) of the bottom surface (14) of the depression (2c).

Figure 6A:
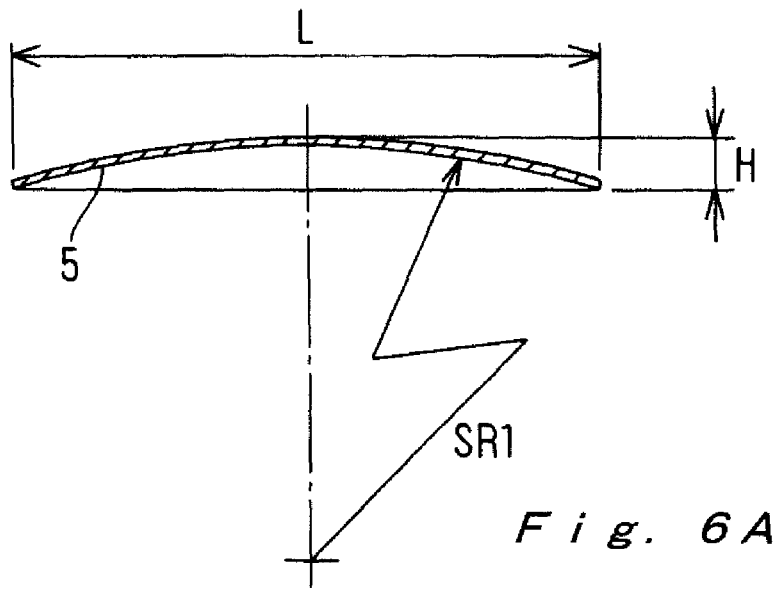
FIG. 6 shows dimensions for the components of a conventional diaphragm valve.
Figure 6B:
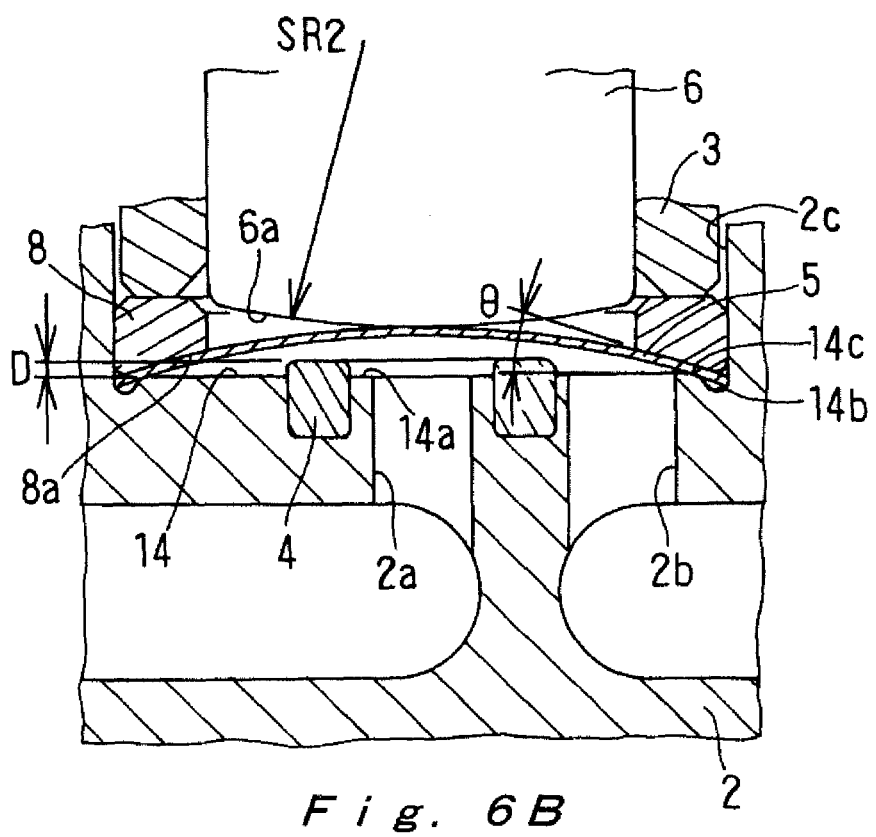

As shown in FIG. 6A, as for specific numerical values for each component, the diameter (L) of the diaphragm (5) is φ8, the height (H) of the diaphragm (5) is 0.65 mm, and the radius of curvature (SR1) of the diaphragm (5) is SR13.5. As shown in FIG. 6B, the taper angle (θ) of the lower surface (8a) of the press adapter (8) is 16° relative to the flat portion (14a) of the bottom surface (14) of the depression (2c) of the body (2). The radius of curvature (SR2) of a surface (6a) of the diaphragm presser (6), which surface is in contact with the diaphragm (5), is SR12. The height (D) of the seat (4) from the flat portion (reference plane) (14a) of the bottom surface (14) of the depression (2c) is D=0.2 mm.

FIGS. 1 and 2 show a main portion of the diaphragm valve (1) according to the first embodiment of the present invention.

This embodiment is different from the conventional art in that, as shown in FIG. 1, the flat portion (reference plane) (14a) of the bottom surface (14) of the depression (2c) of the body (2) is provided with a spot facing (15) so as to include a portion of the fluid outflow channel (2b), which portion is open to the bottom surface (14) of the depression (2c).

The spot facing (15) is provided such that the outer periphery (diaphragm support portion) (14c) of the flat portion (14a) for supporting the outer peripheral edge portion of the diaphragm (5) remains to exist. Because the spot facing (15) is provided, the fluid outflow channel (2b) formed at the bottom surface (14) of the depression (2c) of the body (2) has an enlarged inlet area. In addition, the height of the portion holding the seat (4) at the bottom surface (14) of the depression (2c) of the fluid outflow channel (2b) is lowered by an amount corresponding to the spot facing (15).

Figure 2A:
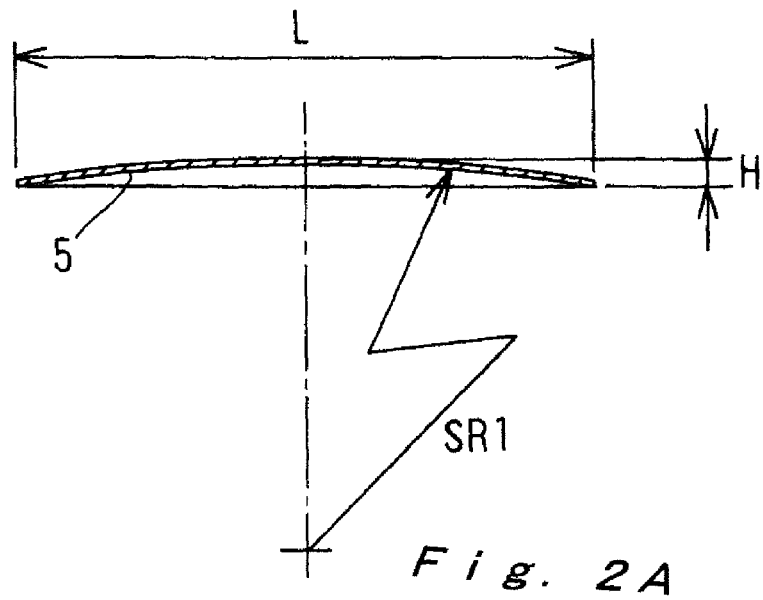
FIG. 2 shows dimensions for the components of the diaphragm valve according to the first embodiment, which is comparable with FIG. 6.
Figure 2B:
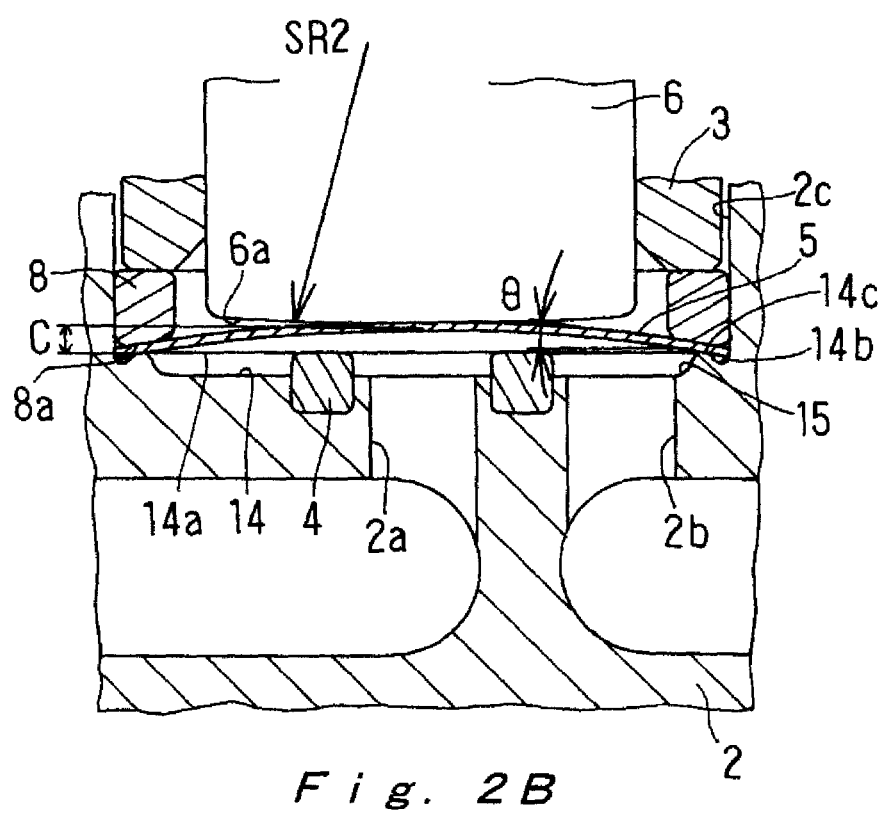

The embodiment is different from the conventional art in that, as shown in FIG. 2A, further, the height (H) of the diaphragm (5) is 0.4 mm, and the radius of curvature (SR1) of the diaphragm (5) is SR23. The diameter (L) of the diaphragm (5) is φ8, which is same as in the conventional art. In addition, as shown in FIG. 2B, the radius of curvature (SR2) of the surface (6a) of the diaphragm presser (6), which surface is in contact with the diaphragm (5), is SR42, and the taper angle (θ) for the lower surface (8a) of the press adapter (8) is 9°. The distance C, from the outer periphery (diaphragm support portion which is in close contact with the outer peripheral edge portion of the diaphragm (5) under pressure) (14c) of the flat portion (14a) of the depression (2c) when the valve is open, to the vertex of the diaphragm (5) is 0.35 mm.

In other words, the radius of curvature (SR2) of the surface (6a) of the diaphragm presser (6), which surface (6a) is in contact with the diaphragm (5), is enlarged, whereby increase of the contact area between the diaphragm presser (6) and the diaphragm (5) is attempted, which leads to reduction in load at a center of the diaphragm (5). Furthermore, the taper angle (θ) for the lower surface (8a) of the press adapter (8) is set such that the lower surface (8a) is along the diaphragm (5), and in order to prevent interference with the diaphragm presser (6), an inner diameter of the press adapter (8) is large.

Regarding the height of the seat (4) in the first embodiment, D is 0.05 mm (in the drawings, 0), as compared with D=0.2 mm in the conventional art, which is adjusted to conform to the shape of the diaphragm (5). In association with this adjustment, the amount of lifting of the diaphragm (5) is 0.27 mm, which is less than conventional 0.37 mm by 0.1 mm.

It should be noted that the diaphragm (5) is formed of two laminated sheets of diaphragms each having a thickness of 0.05 mm. This configuration is the same between the conventional art and the present embodiment.

The vertex of the diaphragm (5) is defined as a vertex of the upper surface of the diaphragm at the lowermost layer (on the liquid-contact side). This means that in the case of the diaphragm (5) formed of two laminated sheets of diaphragms, the vertex which passes through the center of its thickness is the vertex of the diaphragm (5). The above-described definition is based on evaluation results that, in considering the durability, when one layer of the diaphragm is focused on, a distance between a fixation point (support point=diaphragm support portion (14c) of the body (2)) of the diaphragm, and a press point (power point=point of contact with the diaphragm presser (6)=vertex of the spherical cover part of the diaphragm (5)) becomes a major factor with which the durability is determined.

In the case where the diaphragm 5 is formed of one diaphragm, the vertex of the diaphragm (5) becomes the vertex of the upper surface of the diaphragm (5). In the case where the diaphragm 5 is formed of three or more diaphragms, the vertex is defined in the same manner as in the case of the two diaphragms. As long as dimensions of one sheet of the diaphragm as a component are the same, the diaphragm (5) has a vertex in the same manner as in the case of one sheet of diaphragm, or four sheets of diaphragms.

Tables 1 and 2 show results of comparison between the diaphragm valve according to the first embodiment shown in FIGS. 1 and 2 (small-sized diaphragm valve) and a conventional small-sized diaphragm valve shown in FIG. 6.

Table 1 shows differences between the diaphragm valve according to the first embodiment and the conventional small-sized diaphragm valve shown in FIG. 6. Table 2 shows the specifications and performances, as compared with the existing diaphragm valve having a common size (standard).

TABLE 1

| Name of component | Modified point | Conventional art | First embodiment |
|---|---|---|---|
| Diaphragm | Height | 0.65 mm | 0.4 mm |
| | SR | 13.5 mm | 23 mm |
| Seat | Seat Height | +0.2 mm | +0.05 mm |
| Diaphragm presser | Leading end shape | SR12 | SR42 |
| Press adapter | Contact surface angle | 16° | 9° |

TABLE 2

| | Standard | Small size (Conventional Art) | Small size (Embodiment) |
|---|---|---|---|
| Total height (mm) | 67 | 42 | 42 |
| Body dimension (mm) | 57 | 32 | 32 |
| Casing dimension (mm) | Φ40 | Φ19 | Φ19 |
| Maximum working pressure (MPa) | 1.0 | 0.5 | 0.5 |
| Operating temperature range (° C.) | −10 to 80 | −10 to 80 | −10 to 80 |
| Cv value | 0.3 | 0.02 | 0.04 |
| Weight (g) | 327 | 35 | 35 |
| Working Pressure (MPa) | 0.4 to 0.6 | 0.4 to 0.6 | 0.4 to 0.6 |
| Durable number of times | at least 4 million times | 100 to 300 thousand times | at least 4 million times |

It is noted from Table 2 that the diaphragm valve according to the embodiment is small-sized, but has an extremely excellent durability, which durability is comparable to that of the diaphragm valve having a standard size, and that the diaphragm valve according to the embodiment has not only improved durability but also increased Cv value as compared to the conventional art having the same small size. The Cv value is a flow coefficient for the valve, which is a value representing a flow rate when the fluid flows through the valve under the pressure drop across the valve.

Regarding the durability for these small-sized diaphragm valves, the durability of the diaphragm valve of the embodiment is vastly improved. This is because, in the embodiment, the shape (SR) of diaphragm presser (6) is made SR42 and the taper angle (θ) of the press adapter (8) is made 9°. When the index for the durable number of time is set "four million times" which is comparable to the conventional art, the durable number of times turned out to be at least four million times. Considering that the diaphragm valve according to the embodiment has sufficient durability, it is considered to be appropriate to set a condition for securing about four million times for durability, such that the radius of curvature (SR) of the surface of the diaphragm presser (6), which surface is in contact with the diaphragm (5), is at least 30 mm, and that the taper angle (θ) for the lower surface of the press adapter (8) is no more than 10° relative to the flat portion (14a) of the bottom surface (14) of the depression (2c) of the body (2).

In addition, from the fact that distance C, from the outer periphery (diaphragm support portion which is in close contact with the outer peripheral edge portion of the diaphragm (5) under pressure) (14c) of the flat portion (14a) of the bottom surface (14) of the depression (2c) when the valve is open, to the vertex of the diaphragm (5) is 0.35 mm, the following holds true. When the valve is open, a ratio of diameter L of the diaphragm (5), to a distance (C) from the diaphragm support portion (14c) of the bottom surface (14) of the depression (2c) of the body (2), which bottom surface is in close contact with the diaphragm (5) under pressure, to a vertex of the diaphragm (5) is preferably 18:1 to 30:1.

In the above, since L is 0, the preferable range for C in the case where L is 0 is 0.27 mm to 0.44 mm (about 0.25 mm to 0.45 mm).

In the case where a ratio of the diameter of the diaphragm (5), to a distance (the height of the vertex of the diaphragm (5)) from the bottom surface (14) of the depression (2c) of the body (2), which bottom surface is in close contact with the diaphragm (5) under pressure, to the vertex of the diaphragm is less than 18:1 (in the case where C exceeds 0.45 mm), the durability greatly decreases. In the case where the ratio exceeds 30:1 (in the case where C is less than 0.25 mm), the flow rate is significantly insufficient. By making the above-described ratio 18:1 to 30:1, a diaphragm valve which is small-sized and excellent in durability and, further, which is also excellent in terms of securing the flow rate may be obtained.

The comparison between the small-sized diaphragm valves revealed that the Cv value for the embodiment is twice as great as that for the conventional art. What contributes to this revelation is the configuration that the flat portion (14a) of the bottom surface (14) of the depression (2c) of the body (2) is provided with a spot facing (15) so as to include a portion of the fluid outflow channel (2b), which portion is open to the bottom surface (14) of the depression (2c). That is, the provision of the spot facing (15) and the enlargement of the inlet area of the fluid outflow channel (2b) result in the Cv value which is twice as high as the conventional art.

Generally, in the case where the radius of curvature of the diaphragm (5) is enlarged from SR13.5 to SR23, the Cv value decreases. That is to say, in the present embodiment, not only reduction of the flow rate in association with the shape change of the diaphragm (5) is compensated for, but also the flow rate is greatly increased.

As described above, in the embodiment, the Cv value and the durability of the diaphragm, which are opposing performances, are compatible with each other at high levels.

Figure 3A:
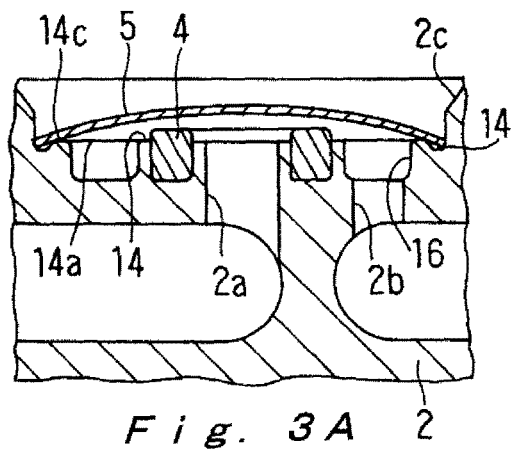
FIG. 3A is a vertical cross-sectional view of the principal components.
Figure 3B:
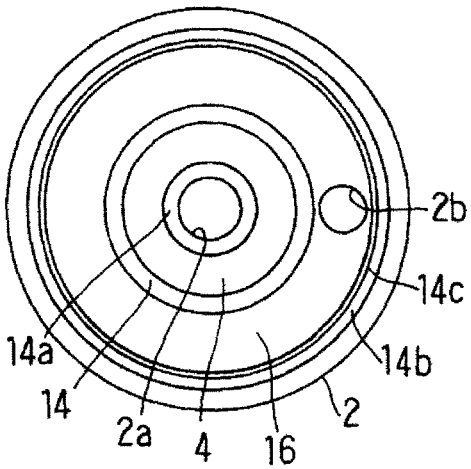
FIG. 3B is a plan view of FIG. 3A from which a diaphragm is removed.

In order to increase the Cv value, instead of providing the spot facing (15) (almost entire surface of the flat portion (14a) of the bottom surface (14) of the depression (2c) is cut), an annular groove (16) which includes a portion of the fluid outflow channel (2b), which portion is open to the bottom surface (14) of the depression (2c), may be formed as shown in FIG. 3.

The depth of the annular groove (16) is greater than the depth of the spot facing (15). In the case of the annular groove (16), a portion which holds the seat (4) has the same shape as the conventional art.

In the case of the annular groove (16), crimping of the seat (4) may be performed from both the outer diameter side and the inner diameter side of the seat (4) whereby the seat (4) may be fixed tightly.

In the case of the spot facing (15), the crimping of the seat (4) is performed from only the inner diameter side. By providing the spot facing (15), the fluid outflow channel (2b) has an enlarged inlet area and the Cv value becomes great, as compared to the case of the annular groove (16).

Figure 4A:
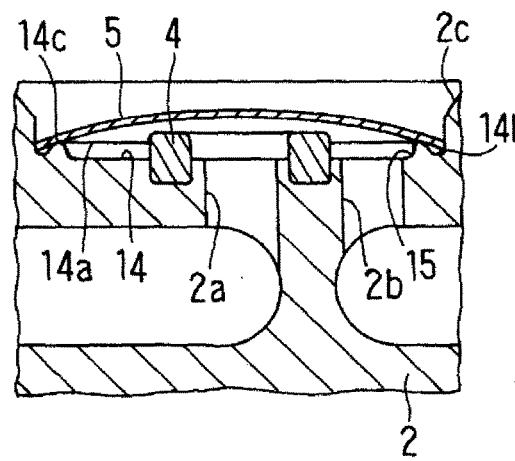
FIG. 4A is a vertical cross-sectional view of the principal components.
Figure 4B:
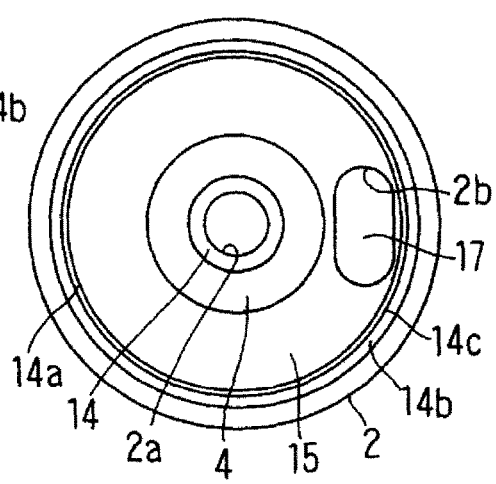
FIG. 4B is a plan view of FIG. 4A from which a diaphragm is removed.

In order to increase the Cv value further, as shown in FIG. 4, not only the spot facing (15) may be provided, but also the cross-sectional shape of the fluid outflow channel (2b) may be an elongated hole (17).

The cross-sectional shape of the elongated hole (17) may be, as shown in the drawings, one which is formed by adding semi-circular portions to both ends of the rectangular portion, may be an ellipse, or may be a crescent which conforms to the shape of the spot facing (15).

The elongated hole (17) may be combined with the annular groove (16) shown in FIG. 3. That is, in FIG. 3, the cross-sectional shape of the fluid outflow channel (2b), which is circular, may be the elongated hole (17) the cross-sectional shape of which is shown in FIG. 4.

In the above-described diaphragm valve, the stem (7), the piston (10), the compression coil spring (biasing member) (11), the operational air introduction chamber (12), the operational air introduction channel (13), and so on constitute vertical movement means which causes the diaphragm presser (6) to move vertically. However, the configuration of the vertical movement means is not limited to one shown in FIG. 1.

Figure 7:
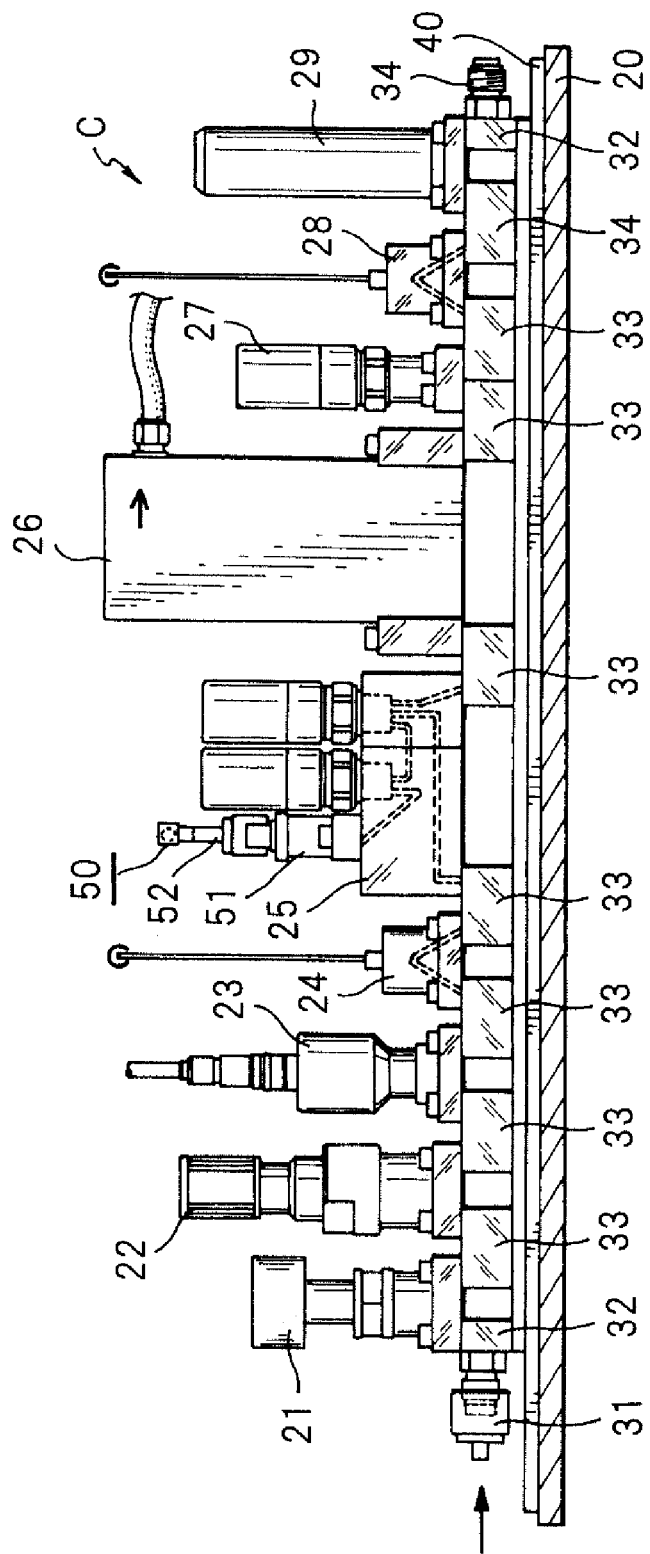
FIG. 7 is a side elevational view showing one example of a fluid control device for a semiconductor manufacturing apparatus, in which the diaphragm valve in accordance with the present invention is used.

The above-described diaphragm valve may be used as an on-off valve in the fluid control device shown in FIG. 7, for example. Since the diaphragm valve is downsized and is excellent in durability, the fluid control device which uses such a diaphragm valve is suitable to be used as a gas supply section in the semiconductor manufacturing apparatus, which has a problem of downsizing.

Examples of the semiconductor manufacturing apparatus include a CVD apparatus, a spattering apparatus, and an etching apparatus.

The CVD apparatus is an apparatus which forms a passivation film (oxide film) on a wafer and which is composed of energy supply means, a vacuum chamber, gas supply means (a fluid control device), and gas exhaust means.

The etching apparatus (dry etching apparatus) is an apparatus which treats a material surface or the like by means of a corrosive action of a gas having reactivity and which is composed of energy supply means, a treatment chamber, gas supply means (a fluid control device), and gas exhaust means.

The spattering apparatus is an apparatus which forms a film on a surface of the material and which is composed of a target, energy supply means, a vacuum chamber, gas supply means (a fluid control device), and gas exhaust means.

In the semiconductor manufacturing apparatus selected from among the CVD apparatus, the spattering apparatus and the etching apparatus, gas supply means (a fluid control device) is an essential configuration, and, therefore, downsizing the gas supply means enables downsizing of the semiconductor manufacturing apparatus.

The fluid control device is not limited to one shown in FIG. 7. The semiconductor manufacturing apparatus is not limited at all.

INDUSTRIAL APPLICABILITY

Because the durability of the diaphragm of the present invention is greatly improved, the present invention contributes to improvement of the performances of the diaphragm valve, the fluid control device provided with the diaphragm valve, the semiconductor manufacturing apparatus provided with the diaphragm valve, and the like.

The invention claimed is:
1. A diaphragm valve comprising:
  a body provided with a fluid inflow channel, a fluid outflow channel, and a depression which is open upward;
  a seat disposed on a peripheral edge of the fluid inflow channel of the body;

a spherical-shell-shaped diaphragm which is elastically deformable and which is pressed against and separated from the seat to close and open the fluid inflow channel, respectively;

a press adapter which holds an outer peripheral edge portion of the diaphragm between the press adapter and a bottom surface of the depression of the body;

a diaphragm presser which presses a center portion of the diaphragm; and vertical movement means which vertically moves the diaphragm presser; and the press adapter being tapered with an entire lower surface thereof having a predetermined angle of inclination, and the bottom surface of the depression of the body having a circular flat portion and a depressed portion which is contiguous to an outer periphery of the flat portion and which is depressed relative to the flat portion, wherein the flat portion of the bottom surface of the depression of the body is provided with a groove so as to include a portion of the fluid outflow channel, which portion is open to the bottom surface of the depression, wherein a radius of curvature of a surface of the diaphragm presser, which surface is in contact with the diaphragm, is at least 30 mm and no more than 50 mm, and a taper angle for the lower surface of the press adapter is at least 5° and no more than 10° relative to the flat portion of the bottom surface of the depression of the body.

2. A fluid control device comprising an on-off valve as a fluid controller, wherein the on-off valve is the diaphragm valve according to claim 1.

3. The fluid control device according to claim 2, wherein the fluid control device is used in a semiconductor manufacturing apparatus.

4. A semiconductor manufacturing apparatus comprising the fluid control device according to claim 2 as a gas supply section.

5. The semiconductor manufacturing apparatus according to claim 4, wherein the semiconductor manufacturing apparatus is a CVD apparatus, a spattering apparatus, or an etching apparatus.

6. A semiconductor manufacturing method, wherein a semiconductor is manufactured using the semiconductor manufacturing apparatus according to claim 5.

7. The diaphragm valve according to claim 1, wherein the groove is a spot facing configured to be contiguous to a portion that holds the seat.

8. A fluid control device comprising an on-off valve as a fluid controller, wherein the on-off valve is the diaphragm valve according to claim 7.

9. The fluid control device according to claim 8, wherein the fluid control device is used in a semiconductor manufacturing apparatus.

10. A semiconductor manufacturing apparatus comprising the fluid control device according to claim 8 as a gas supply section.

11. The semiconductor manufacturing apparatus according to claim 10, wherein the semiconductor manufacturing apparatus is a CVD apparatus, a spattering apparatus, or an etching apparatus.

12. A semiconductor manufacturing method, wherein a semiconductor is manufactured using the semiconductor manufacturing apparatus according to claim 11.

13. A diaphragm valve comprising:
a body provided with a fluid inflow channel, a fluid outflow channel, and a depression which is open upward;

a seat disposed on a peripheral edge of the fluid inflow channel of the body;

a spherical-shell-shaped diaphragm which is elastically deformable and which is pressed against and separated from the seat to close and open the fluid inflow channel, respectively;

a press adapter which holds an outer peripheral edge portion of the diaphragm between the press adapter and a bottom surface of the depression of the body;

a diaphragm presser which presses a center portion of the diaphragm; and vertical movement means which vertically moves the diaphragm presser; and the press adapter being tapered with an entire lower surface thereof having a predetermined angle of inclination, and the bottom surface of the depression of the body having a circular flat portion and a depressed portion which is contiguous to an outer periphery of the flat portion and which is depressed relative to the flat portion, wherein, when the valve is open, a ratio of a diameter of the diaphragm, to a distance from the bottom surface of the depression of the body, which bottom surface is in close contact with the diaphragm under pressure, to a vertex of the diaphragm is 18:1 to 30:1, and wherein a radius of curvature of a surface of the diaphragm presser, which surface is in contact with the diaphragm, is at least 30 mm and no more than 50 mm, and a taper angle for the lower surface of the press adapter is at least 5° and no more than 10° relative to the flat portion of the bottom surface of the depression of the body.

14. A fluid control device comprising an on-off valve as a fluid controller, wherein the on-off valve is the diaphragm valve according to claim 13.

15. The fluid control device according to claim 14, wherein the fluid control device is used in a semiconductor manufacturing apparatus.

16. A semiconductor manufacturing apparatus comprising the fluid control device according to claim 14 as a gas supply section.

17. The semiconductor manufacturing apparatus according to claim 16, wherein the semiconductor manufacturing apparatus is a CVD apparatus, a spattering apparatus, or an etching apparatus.

18. A semiconductor manufacturing method, wherein a semiconductor is manufactured using the semiconductor manufacturing apparatus according to claim 17.

* * * * *